United States Patent [19]
Schwartz

[11] 3,712,559
[45] Jan. 23, 1973

[54] TAPE CASSETTE AND IMPROVEMENTS THEREFOR

[75] Inventor: Vern R. Schwartz, Cupertino, Calif.

[73] Assignee: Information Terminals Corp., Mountain View, Calif.

[22] Filed: Nov. 5, 1969

[21] Appl. No.: 874,176

[52] U.S. Cl. ......................242/199, 242/74, 242/76, 242/210, 274/4 C

[51] Int. Cl......G11b 23/10, B65h 05/28, B65h 27/00

[58] Field of Search.........242/210, 200, 199, 198, 74

[56] References Cited

UNITED STATES PATENTS 3,027,110 3/1962 Andrews ............................242/210
3,062,468 11/1962 Braun....................................242/74
3,495,787 2/1970 Wallace................................242/199

FOREIGN PATENTS OR APPLICATIONS 1,940,305 6/1966 Germany.............................242/199

*Primary Examiner*—George F. Mautz
*Attorney*—Townsend & Townsend

[57] ABSTRACT

A tape cassette having improvements including a hub having means for securely adapting a tape leader thereto, a slip sheet for assuring uniformity of the winding of a tape pack on a hub, an idler post having anti-friction means on its outer periphery, means for distinguishing a pair of tape hubs in a tape cassette, and identification means on the cassette to provide an interlock structure when the cassette is used with a transport apparatus. The improvements are especially adapted for use with a Phillips type cassette and are utilized without changing the standards established for such a cassette.

9 Claims, 11 Drawing Figures

INVENTOR.
VERN R. SCHWARTZ
BY Townsend and Townsend
ATTORNEYS

INVENTOR.
VERN R. SCHWARTZ
BY
Townsend and Townsend
ATTORNEYS

INVENTOR.
VERN R. SCHWARTZ
BY Townsend & Townsend
ATTORNEYS

TAPE CASSETTE AND IMPROVEMENTS THEREFOR

This invention relates to improvements in tape cassettes of the type known as Phillips cassettes.

Tape cassettes are now being used for recording and playback of digital data and such use requires that the cassettes have reliable performance characteristics. The cassettes must also be quiet, must operate in a static-free manner and must provide for almost perfect tape packing as tape is moved through the cassettes. The cassettes used for digital recording and playback must be capable of repeated usage and must be able to operate at relatively high tape speeds with frequent stopping, starting and reversing of the tape. Thus, tape leaders must remain securely anchored even under the high stresses to which the tape is subjected during stopping, starting and reversing.

The present invention provides improvements for a tape cassette used for digital data recording and playback by providing structure capable of meeting the rigorous demands of tape cassettes used in this manner. One of the improvements provides a tape hub having improved means for securing a tape leader thereto which will positively prevent pull-out of the leader at all times, even under the most rugged, high-speed starting, stopping and reversing operations. The improved hub also provides for perfectly concentric tape winding thereon to form a uniform tape pack. The hub also prevents damage to the tape as the tape is wound on and unwound from the tape pack. The hub further eliminates the flat spot effect on the tape pack which is generally encountered with conventional hubs having a relatively large leader locking clamp insert. The hub further provides uniformity of operating tape speed. The hub configuration presents a nearly perfect symmetrical form without large voids in the leader lock insert area, thus allowing high rotational speeds without dynamic unbalance.

Another improvement of the tape cassette of this invention resides in an improved slip sheet for a tape cassette which provides for greater uniformity in the formation of a tape pack on a hub within a cassette. Specifically, such packing uniformity has reference to the nearly exact centering of each successive tape layer or convolution with respect to the preceding tape layer in the formation of a tape pack on a hub within a cassette. Such uniformity presents a smooth load bearing area on the sides of the tape pack which prevents external shock forces from damaging the edge of the tape when the latter is in the form of convolutions in a tape pack. Furthermore, such uniformity allows the weight of the tape pack to be evenly distributed over the load bearing edges of every tape convolution forming the tape pack instead of only a relatively few tape edges which is the case in a staggered tape pack as formed by the conventional cassette slip sheet. The slip sheet has ribs for engaging the tape as it moves onto respective hubs to thereby properly center the tape with respect to the underlying convolution to thereby achieve the desired uniformity in the formation of the tape pack. The slip sheet also provides for minimum static build-up and for minimum generation of debris which has heretofore been a major cause of drop-outs in cassettes having conventional slip sheets.

A further improvement in the cassette of the invention resides in a fixed idler post for providing minimum friction with respect to the movement of the tape past the post. This improvement also assures quiet operation of the cassette, longer operating life therefor and the proper positioning of the tape at all times. To achieve these ends, the post is provided with an anti-friction coating on its outer periphery to reduce the frictional force exerted on the moving tape.

Other improvements of this invention include the provision of means on a pair of tape hubs for a tape cassette wherein the hubs are distinguished from each other, and means on a tape cassette of the type described for providing identification indicia therefor, whereby such indicia can be sensed and used to enable the operation of a tape transport with which the cassette is used.

The primary object of this invention is to provide improvements in a Phillips type cassette to provide for more uniform formation of tape packs in the cassette to minimize damage to the sides of the tape pack while rotating in the cassette, to evenly distribute tape pack weight so as to reduce unit area loading allowing substantially less generation of wear product debris, to decrease the generation of noise and the build-up of static within the cassette and generally increase the useful operating life thereof so that the cassette is especially suitable for use in the recording and playback of digital data.

Another object of this invention is to provide improvements for a tape cassette of the type described including a hub having means for positively securing a tape leader thereto to prevent the separation of the tape leader from the hub during high-speed stopping, starting and reversing operations while at the same time providing for uniform formation of a tape pack on the hub.

A further object of this invention is to provide an improved slip sheet for a Phillips type cassette which effectively guides the tape uniformly onto a tape pack so that the convolutions of the pack are properly aligned with each other to thereby avoid the build-up of static and the generation of debris in the cassette as the tape is wound onto the tape pack.

Still another object of this invention is to provide an improved idler post for fixed attachment to a cassette wherein the post has a coating of anti-friction material to reduce the frictional force on the tape as it moves through the cassette.

Other objects of this invention include the provision of a pair of hubs for a tape cassette which have means for distinguishing the same from each other to thereby permit visual determination of which of the channels of the tape are ready to be played back; and the provision of identification means on a tape cassette which can be sensed and used to provide an enabling signal for operating a tape transport with which the cassette is utilized.

Other objects of this invention will become apparent as the following specification progresses, reference being had to the accompanying drawings for illustrations of the invention.

Figure 1:
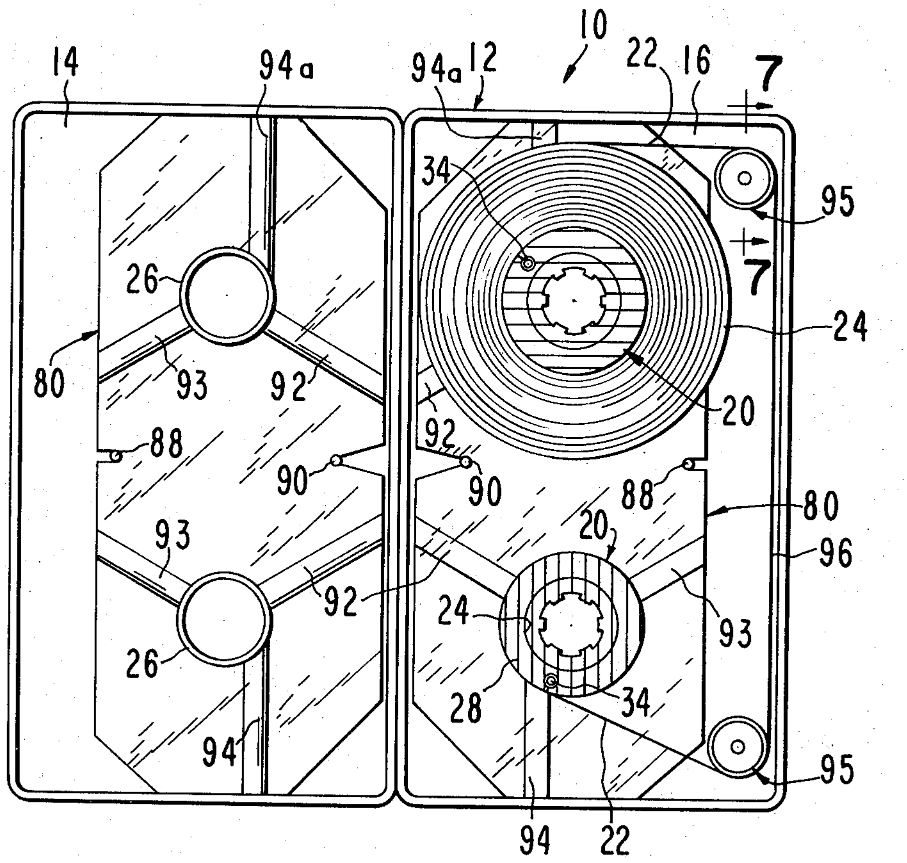
FIG. 1 is a plane view of a tape cassette utilizing the improvements of the present invention, with the two halves of the cassette open end generally coplanar with each other.
Figure 3:
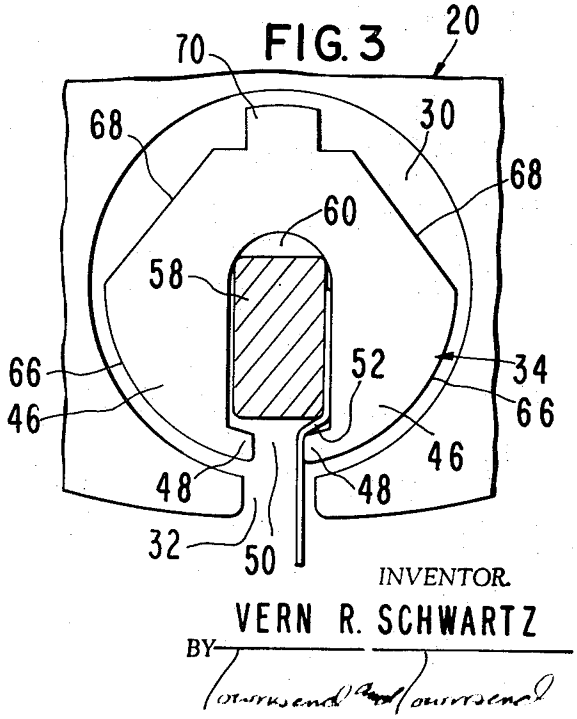
FIG. 3 is a view similar to FIG. 2 but showing an element in the opening for winding an end portion of the tape therewithin.
Figure 3A:
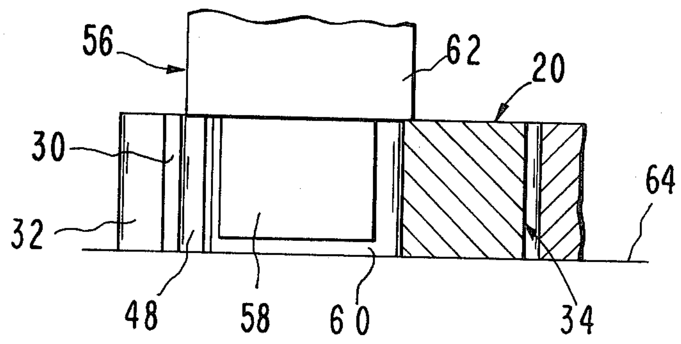
Figure 8:
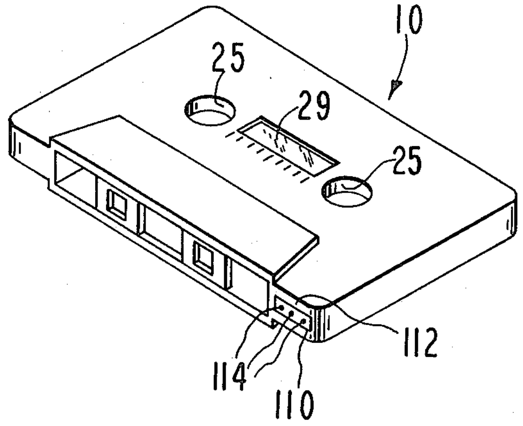
Figure 8A:
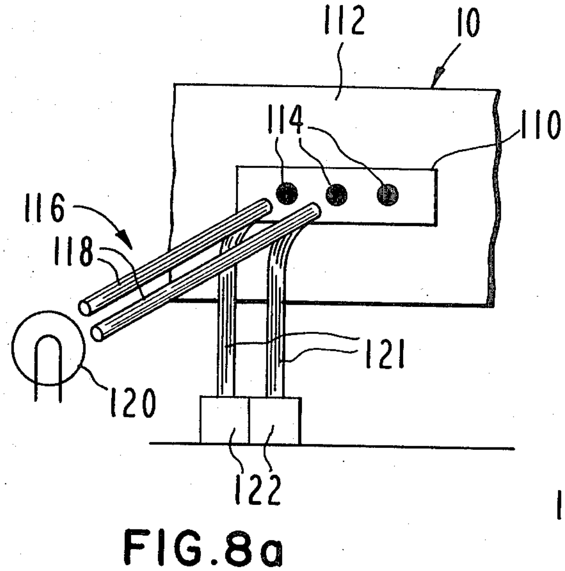
Figure 8B:
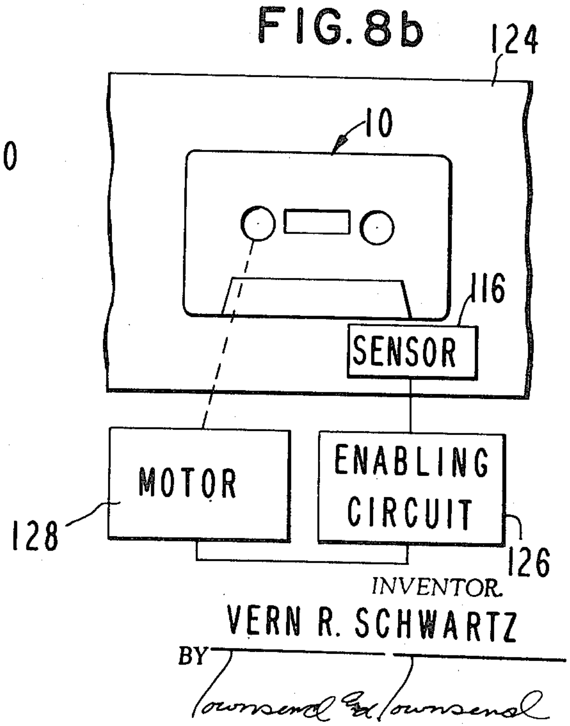
Figure 4:
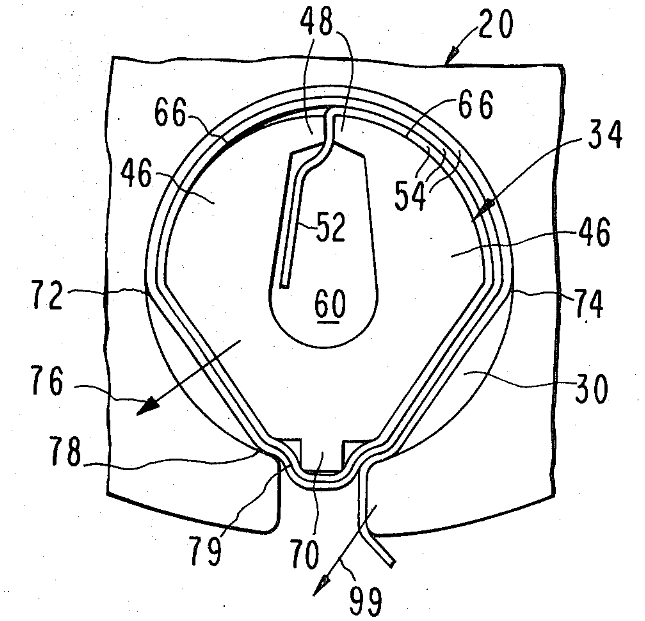
Figure 6:
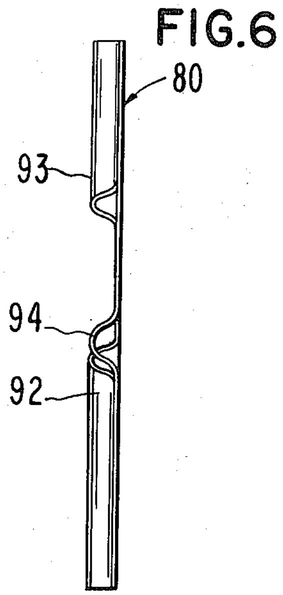
Figures 5, 7:
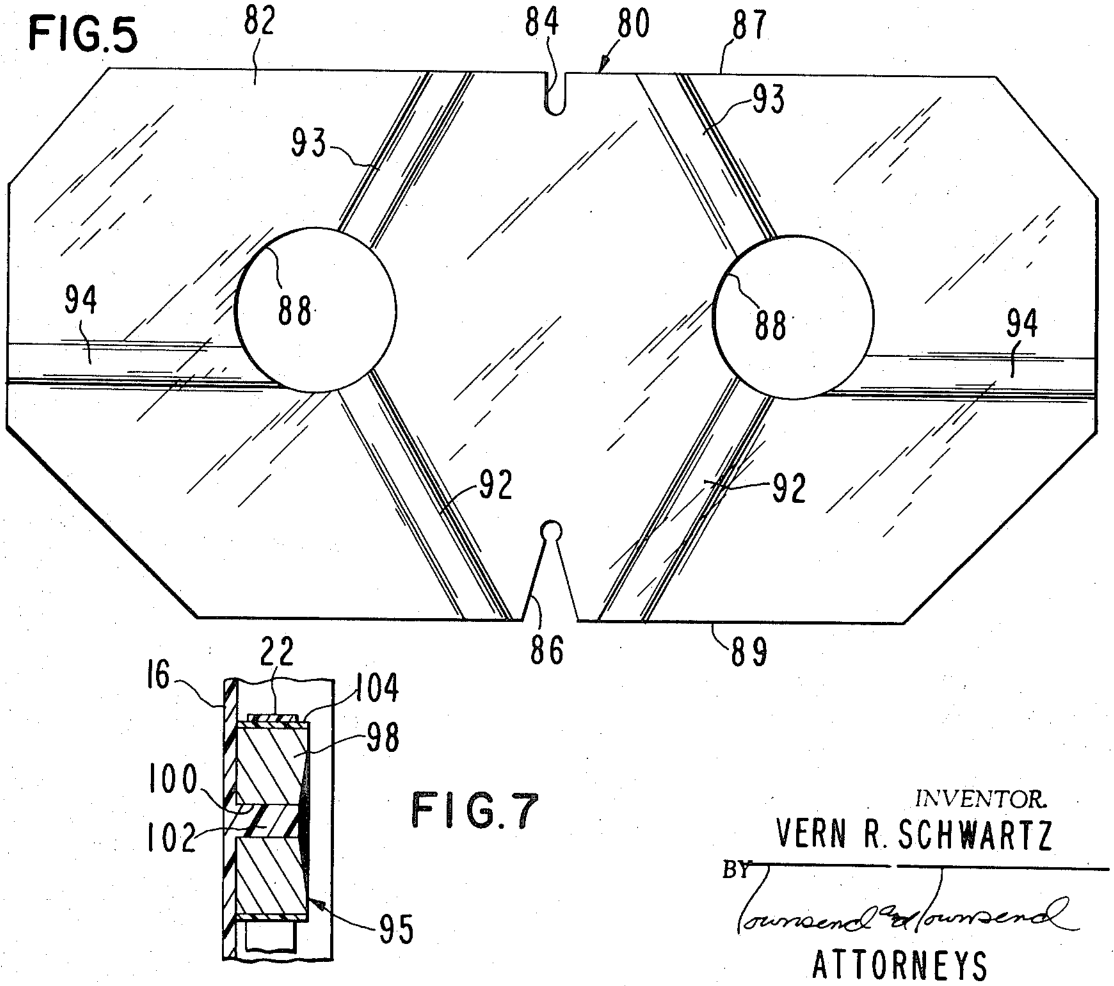

FIG. 3*a* is a fragmentary, axial cross section of the hub and winding element with a winding tool coupled to the element;

FIG. 4 is a view similar to FIG. 3 but showing the forcing action of the element for an end portion of a tape wrapped thereon;

FIG. 5 is a side elevational view of a slip sheet of this invention;

FIG. 6 is a cross-sectional view of the slip sheet;

FIG. 7 is an enlarged cross-sectional view taken along line 7—7 of FIG. 1;

FIG. 8 is a perspective view of a tape cassette showing identification means thereon;

FIG. 8*a* is an enlarged, fragmentary, elevational view of the identification means on a cassette with an identity sensor shown in schematic form; and FIG. 8*b* is a fragmentary, schematic view of a transport for the cassette and a circuit for enabling the operation of the same.

The improvements in tape cassettes which form the subject matter of this invention will hereafter be described with respect to a cassette 10 of the type shown as a Phillips cassette. Such a cassette is shown in FIG. 8 and comprises a housing 12 formed from a pair of shell-like sidewalls 14 and 16 (FIG. 1) which have generally planar or flat, protuberance-free inner surfaces, and continuous, inwardly extending flanges which mate when the sidewalls are substantially parallel with each other to form a tape-receiving space therebetween. The cassette is preferably molded from a suitable plastic material and provided with interlocking pin and socket locators which interconnect sidewalls 14 and 16 to allow the same to maintain coincidence, thus forming the cassette. The open condition of the cassette is shown in FIG. 1 to illustrate the relative positions of the tape hubs, the slip sheets adjacent thereto and the idler posts which are constructed in accordance with the teachings of this invention. When the cassette is closed, the sidewalls are coupled together in any suitable manner, which as by an adhesive or by a bond effected by ultrasonic bonding techniques.

One aspect of cartridge 10 which represents an improvement of this invention is a tape hub 20 for use in the cassette, there being two such hubs shown in FIG. 1 for forming respective tape packs with the use of an elongated, flexible, magnetic tape 22. The tape is shown in wrapped relationship on the upper of the two hubs to form a tape pack 24. For purposes of illustration, each end of the tape will be considered to have a flexible leader attached thereto, each leader being coupled to a respective hub in a manner to be described.

Each hub has a central opening extending axially therethrough for receiving a rotatable drive spindle or shaft forming a part of a transport with which cassette 10 is to be used. A number of spaced teeth integral with the hub extend into the central opening and are adapted to mesh with projections on ribs on the drive shaft of an appropriate cassette transport drive so that the hub will be rotated thereby, the drive shaft being driven by a reel motor or the like.

Each hub is rotatably mounted in the cassette such as by a pair of mounting rings 26 integral with respective sidewalls 14 and 16 and surrounding adjacent holes 25 (FIG. 8) through respective sidewalls, the rings being axially aligned when the cassette is closed and hub 20 having opposed, annular recesses 24 on its sides for rotatably receiving rings 26.

A Phillips cassette generally has two channels for recorded information, one channel being played back when one hub is coupled to a drive shaft and the other channel being played back when the other hub is connected to the drive shaft. To change from one channel to the other, the cassette must be reversed in position in a transport. Since both sides of the cassette resemble each other very closely, it is difficult to determine, merely by looking at the tape pack or packs through the viewing windows 29 (FIG. 8) provided in sidewalls 14 and 16 which channel is ready to be played back.

To overcome this problem, identity between the two hubs is established by providing identification means on both hubs with the identification means on one hub being different from that of the other hub. This is achieved by having one hub of a first color and the other hub of a second color. Thus, one viewing the central portions of the hubs will at least see the teeth extending into the central openings of respective hubs and will also be able to view through windows 29 to determine which hub has the tape pack of greatest diameter and, by knowing the color scheme, will be able to conclude which channel is ready to be played back. For purposes of illustration, the upper hub of FIG. 1 is blue as denoted by the horizontal hatch lines and the lower hub of FIG. 1 is red as denoted by the vertical hatch lines.

Each hub 20 has an outer periphery 28 which has a predetermined axial length so that the hub can be considered substantially cylindrical. The axial length of the hub is substantially equal to the width of tape 22, such width of the tape being, for instance, .150 inches.

Figure 2:
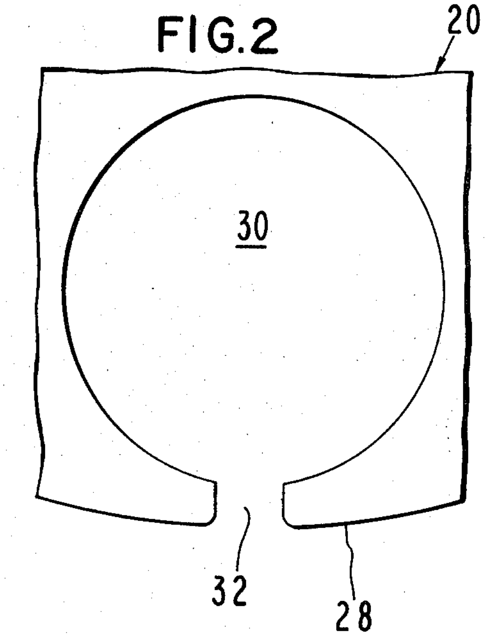
FIG. 2 is an enlarged, fragmentary, side elevational view of a tape hub having an opening extending thereinto from the outer periphery thereof.

Each hub 20 is also provided with a peripheral opening extending thereinto from outer periphery 28 thereof. This opening is shown in an enlarged view in FIG. 2 and includes a generally circular region 30 and a narrow channel 32 spanning the distance between region 30 and outer periphery 28. For purposes of illustration, the circumferential length of channel 32 is approximately .030 inches and the diameter of region 30 is approximately .100 inches.

Region 30 is adapted to loosely receive a tape-winding element 34 in the manner shown in FIG. 3, whereby the element can rotate relative to hub 20. The axial length of the element is substantially equal to that of the hub. The element includes a pair of jaws 46 having end members 48 which define an entrance slot 50 for an end portion 52 of the tape leader when the latter extends thereinto through channel 32 from a location exteriorly of outer periphery 28. Element 34 is formed from a suitable, yieldable material, such as plastic or the like so that, when the leader is wound about the element when the latter is rotated and as tension is maintained on the leader, the jaws are caused to move toward each other in closing relationship to slot 50 so that end members 48 clamp end portion 52 in the manner shown in FIG. 4. The leader is also shown in FIG. 4 as being wound on element 34 to form a number of turns or convolutions 54.

A tool 56 is utilized to rotate element 34 (FIG. 3*a*), the tool having an extension 58 which is substantially rectangular in cross section (FIG. 3) and which is inserted into a centrally disposed passage 60 between jaws 46 (FIG. 3) to cause rotation of element 34 when extension 58 is rotated. The tool has a generally cylindrical handle 62 (FIG. 3*a*) secured in any suitable manner to extension 58, the diameter of handle 62 being greater than that of region 30 to trap one side of the leader in passage 60. Hub 20 will generally be supported on a flat surface 64 before and during the winding operation so that the opposite side of the leader will be trapped to thereby assure that the leader will be properly wound on element 34 and thereby be properly positioned for winding onto the hub to form the corresponding tape pack.

Element 34 has a pair of arcuate surfaces 66 forming the outer periphery of jaws 46, a pair of flat surfaces 68 extending away from respective peripheries 66 and a projection 70 diametrically opposite to entrance slot 50. As will hereinafter be described, projection 70 operates to serve as a stop to inhibit rotation of element 34 after the leader has been wound thereon.

To connect the tape to hub 20, element 34 is first inserted into region 30 when the hub is supported on flat surface 64, following which end portion 52 of the leader is inserted into passage 60 through channel 32 and entrance slot 50. Extension 58 of tool 56 is then inserted in passage 60 to position end portion 52 at one side of the passage as shown in FIG. 3. End portion 52 will be centered in passage 60 by being trapped by the end face of handle 62 and by flat surface 64 in the manner shown in FIG. 3*a*.

Tool 56 is then rotated a number of times until convolutions or turns 54 are formed about element 34 as shown in FIG. 4. As the leader is wound on element 34, the diameter of the convolutions progressively increases until element 34 effectively urges the leader into tight, frictional engagement with the adjacent hub portions.

To this end, the semi-circular portion of convolutions 54 adjacent to peripheries 66 are urged toward hub 20 by element 34 which, in turn, cause a reaction against element 34 to force it to move slightly off-center in region 30 in a direction toward channel 32. This off-center movement combines with the diameter increase at locations denoted by the numerals 72 and 74 to cause jaws 46 to come together and to clamp end portion 52 therebetween. The clamping action of jaws 46 prevents any further decrease in the effective transverse dimension or diameter of element 34 and also securely grips end portion 52 against any movement outwardly of passage 60. Immediately prior to the slight off-center movement of the element, the latter will be positioned so that projection 70 is in alignment with channel 32. Thus, as element 34 moves off-center, projection 70 will move partially into channel 32 into the position shown in FIG. 4 to, in turn, force or wedge the adjacent convolutions against the adjacent portions of hub 20. Such positioning of projection 70 causes the latter to form, with the hub portions defining channel 32, a stop against further rotation of element 34 due to the tension on the leader tending to pull the leader out of region 30. Also, the outwardly directed tension indicated by arrow 99 on the leader acts upon element 34 and resolves its force into a component acting in a direction indicated by arrow 76 and further tends to rotate element 34 in a clockwise sense when viewing FIG. 4 when the leader is disposed as shown in the figure. This tendency to rotate serves to urge element 34 in the direction of arrow 76 (FIG. 4) thereby to increase the force on the convolutions at locations 72 and 78. Furthermore, this tendency to rotate serves to force projection 70 to the left when viewing FIG. 4 to thereby increase the pinching action on the convolutions at location 79. This action thus increases the locking of the leader to the hub and assures a positive attachment of the leader to the hub in a manner which provides that the leader and tape will properly track the outer periphery of the hub. The abovedescribed means of attaching the leader to the hub prevents tape damage, eliminates the need for a flat spot on the outer periphery of the hub as is required on some conventional hubs, and also allows for more uniformity of speed of rotation of the hubs, and further provides a symmetrical hub form without substantial voids thus allowing nearly perfect dynamic balance. Moreover, with the use of the above attachment means, the leader is anchored so securely that it will not break or work loose even under the most extreme high-speed stopping, starting and reversing operations.

The slip sheet of this invention is denoted by the numeral 80 and includes a generally flat or planar sheet 82 of a suitable material which can be of anti-static treated nylon or tetrafluoroethylene. Sheet 82 has a thickness of approximately .002 or .003 inches and is provided with a pair of recesses 84 and 86 extending inwardly from side edges 87 and 89, respectively. These recesses are disposed to receiving spaced pins 88 and 90, respectively, (FIG. 1) secured to the inner surface of a corresponding sidewall of the cassette. These pins position the slip sheets in the manner shown in FIG. 1 wherein each slip sheet is adjacent to and extends longitudinally of the inner surface of the corresponding sidewall.

Each slip sheet has a pair of holes 88 therethrough for alignment with rings 26 of the corresponding sidewall, the rings extending through the holes when the slip sheet is properly positioned by pins 89 and 90. The slip sheet also has a number of ribs 92, 93 and 94 for each hole, respectively, the ribs 92 and 93 being substantially radial to the corresponding hole 88 and extending outwardly from the hole in a manner such that the ribs are angularly spaced apart. Ribs 92 and 93 extend to side edges 87 and 89 while rib 94 extends to the adjacent end edge 91 of the slip sheet.

As illustrated, ribs 92 and 93 are approximately 120° apart and rib 94 is positioned approximately .200 inches below the centerline of holes 88 in a plane parallel with side 87, i.e., substantially parallel with a diametral center line through the adjacent hole 88. Rib 94 is positioned so that, when the slip sheet is in the cassette, the rib will be precisely at the location where the leader is tangential to the hub before winding of the tape on the hub commences. This feature is shown with respect to the lower hub 20 in FIG. 1.

Ribs 92, 93 and 94 are preferably integral with sheet 82, each rib having a width less than the diameter of each hub 20 as shown in FIG. 1. One way of providing for ribs is to form sheet 82 from a flat sheet of material and then to heat-form the sheet to form the ribs. The ribs are, in their unflexed state, substantially convex as shown in FIG. 6, and because of the material used to form sheet 82, the ribs are resilient and, because they are hollow and spaced inwardly from the flat inner surfaces of respective sidewalls 14 and 16, will be compressed by the tape when the latter is moved onto the hubs. Since ribs 94 of slip sheets 80 will be on opposite sides of the tape at all times, and are located at or near the place where an incoming tape strand 22 first makes contact at the point of tangency on the receiving hub 20 and, or, the prior applied tape pack 24, these ribs will effectively guide the tape onto the convolutions already on the hub without allowing stagger of the tape to thereby assure that a tape pack is uniformly formed even when the hubs are rotating at relatively high speeds and while generating only a minimum of debris in the cassette. The ribs provide smooth load bearing areas for the tape packs and hubs and prevent external shock forces from damaging the edge of an individual tape convolution on a tape pack.

Specifically, tape moving onto or off a tape pack is contacted on both edges by a pair of opposed ribs on respective slip sheets 80. In FIG. 1, the ribs which contact the tape entering or leaving the illustrated tape pack are denoted by the numerals 94*a*. These two ribs cause the tape to be laid onto or taken off the underlying convolution at the entry point of the tape onto the tape pack. The lateral spacing of ribs 94*a* is determined by the width of the convolutions already forming a tape pack so that these ribs serve to guide the incoming tape directly onto the underlying convolution with a minimum of stagger. The other two ribs 92 and 93 of each slip sheet cooperate with the corresponding ribs of the other slip sheet to position the tape pack and hub symmetrically between the slip sheets and the sidewalls of the cassette.

Another aspect of cassette 10 is the use of a pair of idler posts 94 at the spaced locations adjacent to one side boundary of the cassette. The purpose of posts 94 is to guide tape 22 along a predetermined path so that a stretch 96 of tape 22 can be engaged by capstan means and head means adjacent to the side extremity of the cassette and externally thereof, whereby the tape can be moved and information can be recorded on or read from the tape as it moves. Each post is preferably stationary and, to this end, is mounted in any suitable manner on a sidewall, such as sidewall 16 as shown in FIG. 1.

Each post 95 includes a disk-like body 98 which is provided with a central hole 100 therethrough which receives a pin 102 integral with sidewall 16. A suitable adhesive or other bond is used to rigidly secure body 98 to pin 102.

Body 98 has an outer periphery on which is disposed a layer or coating 104 of an anti-friction material. Tape 22 is disposed about and engages a portion of layer 104 in the manner shown in FIG. 1 when the tape is in an operative position with respect to posts 94.

Body 98 is preferably of a molded material, such as polystyrene, the latter being suitable for ultrasonic bonding to pin 102. Layer 104 is formed from a fluorocarbon material, such as tetrafluoroethylene secured to the outer periphery of body 98 by a suitable bonding means such as a self-adhesive backing.

Layer 104 provides a much lower friction factor to the tape surface moving across it than would be the case with body 98 being uncoated. Also, layer 104 does not accumulate oxide deposits as is the case with conventional idler posts. A small amount of anti-friction material of coating 104 is transferred to the back side of the tape to form an ultra-thin coating thereon to thereby serve to lower the friction factor "as seen" by the pressure pad which presses the tape against a recording and playback head.

Another aspect of the fixed idler post of the invention is that it does not cause an accumulative spiraling, lateral displacement of the tape as does the rotating type of post. Also, the idler post of the invention has no flanges to damage the edges of the tape. Since the fixed idler post may be located on one of the sidewalls of the cassette, the perpendicularity of the post can be closely controlled to thereby minimize lateral forces on the tape which tend to misguide the same from the desired path of travel.

Cassette 10 may be provided with identification marks thereon which can be sensed in any suitable manner to provide a signal corresponding to the identity of the cassette and to the program or data contained therein. To illustrate this, the cassette is provided with a strip 110 of a suitable material, such as plastic tape or the like. The strip is secured at any suitable location on the cassette but, for purposes of illustration, it is secured to an end wall 112 as shown in FIG. 8. The strip is provided with one or more identification marks 114 which can be sensed in any suitable manner such as by optical sensing techniques. For purposes of illustration, the marks 114 can be sensed by a sensor 116 shown schematically in FIG. 8*a* and comprised of a number of fiber optics bundles. One set 118 of fiber optics bundles transmits light or other radiation from a source 120 to respective marks 114. A second set 121 of fiber optics bundles transmits light reflected from the marks to respective phototransistors 122 or other suitable light sensitive electronic components. The phototransistors operate to generate electronic signals in proportion to whether or not light is received thereby.

Marks 114 may have a binary value and may be placed at or omitted from particular locations on strip 110 to designate a particular numeric value. Phototransistors 122 are correspondingly weighted so that the presence of a mark in a particular location will energize a corresponding phototransistor having the equivalent binary value.

Marks 114 can be applied to the cassette in a manner other than by a strip 110. The marks can be applied in a permanent manner such as by a printing process. However, the use of a strip permits removal of the marks and allows replacement with a new set of marks 114 which represent a different identity.

Sensor 116 may be part of a transport 124 (FIG. 8*b*) which is adapted to receive cassette 10. In this way, means can be provided to require a particular identification on the cassette before the latter can operate. To this end, the sensor is coupled to an enabling circuit 126 which, in turn, is coupled to a drive motor 128 coupled to one of the hubs for rotating the same. Unless circuit 126 is actuated, motor 128 will not be energized and circuit 126 is actuated only when sensor 116 senses the proper identification marks on the cassette. For purposes of simplicity, the capstan and head of transport 124 have been omitted from FIG. 8*b*.

Other types of sensors can be used with the identification means on the cassette. Also, sensor 116 of the type shown in FIG. 8*a* can be made such that marks 114 reflect only light of a certain wave band, such as red light. A filter would be provided which would exclude all but the red light before the light reaches the phototransistor. Thus, a hard-to-copy color sensitive interlock means would reject all cassettes but those having the proper reflective wave band.

I claim:

1. A tape cassette comprising: a housing including a pair of spaced sidewalls defining a tape-receiving space therebetween, each sidewall having a generally planar inner surface and a pair of spaced openings therethrough; a pair of spaced hubs rotatably mounted within the housing in alignment with respective openings and adapted to receive a flexible tape in wrapped relationship on the outer peripheries thereof to form respective tape packs thereon with an intermediate stretch of the tape extending between the tape packs, each hub having means on its outer periphery for coupling a corresponding end of the tape thereto; and a pair of slip sheets within the housing, the major portion of each slip sheet being generally planar, one face of said major portion normally engaging the inner surface of a respective sidewall, each slip sheet having a pair of holes therethrough with the holes being axially aligned with the axes of respective hubs, each slip sheet having a group of resilient, hollow ribs for each hole, respectively, the ribs of each slip sheet projecting laterally from the opposite face of said major portion and disposed in alignment with, spaced from and normally out of contact with respective portions of the inner surface of the respective sidewall, whereby the ribs extend into and can flex relative to said space for yieldably engaging respective tape packs therein at circumferentially spaced locations on said tape packs, each rib having a width less than the diameter of the corresponding hub, each slip sheet having a pair of opposed side edges and a pair of opposed end edges, each end edge being adjacent to and spaced outwardly from a respective hole, only one of the ribs of each group extending from a respective hole to the adjacent end edge, the remaining ribs of each group extending from the respective hole to respective side edges of the slip sheet with at least a pair of the remaining ribs of each group being substantially radial with respect to the corresponding hole.

2. A tape cassette as set forth in claim 1, wherein the ribs of one of the slip sheets are in substantial alignment with the corresponding ribs of the other slip sheet.

3. A tape cassette as set forth in claim 1, wherein said one rib is substantially parallel to a diametral center line of the respective hole.

4. An anti-friction device for a tape cassette of the type having guide means and a pair of sidewalls with each sidewall having a generally planar, protuberance-free inner surface comprising: a generally planar slip sheet having a pair of spaced holes therethrough and adapted to be inserted into an operative position in the tape-receiving space of the tape cassette on one side of a tape pack therein with the major portion of one face of the slip sheet being in engagement with the inner surface of a respective sidewall of the cassette, said slip sheet having a pair of opposed side edges and a pair of opposed end edges, each end edge being adjacent to and spaced outwardly from a respective hole, said slip sheet having a group of resilient, hollow ribs for each hole, respectively, each rib having a width less than the diameter of its corresponding hole, said ribs projecting laterally from the opposite face of said slip sheet, whereby the ribs extend into said space for yieldably engaging said tape pack at circumferentially spaced locations thereon when the slip sheet is in said operative position, only one of the ribs of each hole extending between the latter and the adjacent end edge of the slip sheet, the remaining ribs of each group extending between the hole and respective side edges of the slip sheet, said one rib being the only rib engaging the tape between the tape pack and guide means as the tape enters onto or exits from the tape pack.

5. In a tape cassette as set forth in Claim 4, wherein at least a pair of said remaining ribs are substantially radial with respect to the respective hole.

6. An anti-friction device as set forth in claim 4, wherein said one rib is substantially parallel to a diametral center line of the respective hole.

7. An anti-friction device as set forth in claim 4, wherein said ribs are integral with said sheet, the inner surface of each rib being a continuation of said one face of said slip sheet.

8. A device as set forth in claim 4, wherein each of said groups includes three ribs, each of said remaining ribs extending to a respective side edge of the slip sheet, said remaining ribs of each group being substantially radial with respect to the corresponding hole, said one rib of each group being substantially parallel to a diametral center line of the adjacent hole.

9. A tape cassette comprising: a housing including a pair of spaced sidewalls defining a tape-receiving space therebetween, each sidewall having a pair of spaced openings therethrough; a pair of spaced, rotatable hubs within the housing in alignment with respective openings and adapted to receive a flexible tape in wrapped relationship on the outer peripheries thereof to form respective tape packs thereon with an intermediate stretch of the tape extending between the tape packs; and a pair of slip sheets within the housing, each sheet being between the hubs and a respective sidewall, the major portion of each slip sheet being generally planar, one face of the slip sheet being normally in engagement with the inner surface of the adjacent sidewall, each slip sheet being provided with a pair of opposed side edges, a pair of opposed end edges, and a pair of holes therethrough with the holes being axially aligned with the axes of respective hubs, there being an end edge adjacent to and spaced outwardly from each hole, respectively, each slip sheet having a group of resilient, hollow ribs for each hole, respectively, the ribs projecting laterally from the opposite face of the slip sheet and into the space occupied by the hubs for yieldably engaging respective tape packs at circumferentially spaced locations thereon, only one of the ribs of each group extending from a respective hole to the adjacent end edge of the slip sheet, the remaining ribs of each group extending from the corresponding hole to respective side edges of the slip sheet, each rib having a width less than the diameter of each hub, each sidewall having a generally flat inner surface portion aligned with each rib of the adjacent slip sheet, each rib being spaced inwardly from and normally out of contact with the corresponding inner surface portion and being free to flex relative thereto toward and away from the same.

* * * * *